US005235696A

United States Patent [19]

Schaff

[11] Patent Number: 5,235,696

[45] Date of Patent: Aug. 10, 1993

[54] METHOD FOR CONTROLLING AN INTERNAL COMBUSTION ENGINE INCLUDING A STEP OF STORING ADDRESSES OF CONTROL PROGRAMS IN A SEPARATE STORAGE

[75] Inventor: Helmut Schaff, Regensburg, Fed. Rep. of Germany

[73] Assignee: Siemens Aktiengesellschaft, Munich, Fed. Rep. of Germany

[21] Appl. No.: 665,781

[22] Filed: Mar. 7, 1991

[30] Foreign Application Priority Data

Mar. 7, 1990 [EP] European Pat. Off. ........ 90104368

[51] Int. Cl.[5] ............................................. G06F 12/02

[52] U.S. Cl. ............................... 395/425; 364/431.03; 364/431.04; 364/431.12

[58] Field of Search ... 364/200 MS File, 900 MS File, 364/431.03, 431.04, 431.12; 395/400, 425

[56] References Cited

U.S. PATENT DOCUMENTS

| | | | |
|---|---|---|---|
| 4,677,558 | 6/1987 | Böhmler et al. | 364/431.12 |
| 4,794,523 | 12/1988 | Adam et al. | 395/425 |
| 4,908,792 | 3/1990 | Przybyla et al. | 395/725 |

*Primary Examiner*—Joseph L. Dixon
*Assistant Examiner*—Hiep T. Nguyen
*Attorney, Agent, or Firm*—Herbert L. Lerner; Laurence A. Greenberg

[57] ABSTRACT

A control method for an internal combustion engine includes storing at least one address of at least one address distributor of a variable external memory as memory contents of an address block of the variable external memory. Addresses of data are stored in at least one data block of the variable external memory associated with the at least one address distributor as memory contents of the at least one address distributor. An operating program and an initializing program are stored in a read-only memory of a microcomputer. All of the address distributors are read out from the external memory and stored in a working memory of the microcomputer at addresses determined by the operating program, through the use of the initializing program with the aid of the address block at the start of the control method. The data in each of the at least one data block are accessed through the associated address distributors stored in the working memory, through the use of the operating program.

2 Claims, 2 Drawing Sheets

METHOD FOR CONTROLLING AN INTERNAL COMBUSTION ENGINE INCLUDING A STEP OF STORING ADDRESSES OF CONTROL PROGRAMS IN A SEPARATE STORAGE

The invention relates to a control method for an internal combustion engine, including a microcomputer with a working memory and a read-only memory for an operating program, and a variable external memory for specific data to which the operating program gains access.

So-called single-chip computers are often used in such engine control methods for controlling ignition, injection and so forth. They have a microprocessor as a central processing unit, a read-only memory for storing an operating program, and a working memory, along with corresponding bus connections, integrated on one chip. An external memory that can be varied to customer specifications includes the data with which the operating program works.

The advantage of such a configuration is that the operating program is always the same for the most varied types of engines, and only the data in the external memory have to be changed to customer specifications. Such a method is described, for instance, in Published European Application No. 0 154 034 A3.

The external memory has the following structure: the addresses of an address block remain the same in each variant, so that the operating program, which always accesses data through the address block, can be the same in all variants. The memory contents of the address block are the addresses of specific data in data blocks, or the addresses of an address distributor (referred to as a vector field in the European application mentioned above). The memory contents of the address distributor are in turn one or more addresses of specific data.

During the operation of such a system, when the microprocessor has reached the corresponding command in working through the opening program, it addresses the first memory cell of the address block and reads out its memory contents. With that memory content, it then addresses the corresponding memory cell in the data blocks directly, or it addresses a memory cell in the address distributor. In the latter case, it then must address one or more memory cells in the data blocks through the memory contents in the address distributor in order finally to reach the memory contents thereof.

In the last case mentioned above, the path to the contents of a certain memory leads by way of two indirect addressing operations. The number of incremental steps needed to do so slows down the course of the operating program accordingly.

In the system described above, it is also relatively difficult to change the memory contents in the external memory, such as in road tests or optimization procedures. In order to do so, either the entire memory must be replaced, or it must be erased from outside and reprogrammed.

By comparison, it is an object of the invention to provide a control method for an internal combustion engine, which overcomes the hereinafore-mentioned disadvantages of the heretofore-known methods of this general type and to do so in such a way that the microprocessor needs fewer increments for access to special data in the external memory, so that the program runs faster. Moreover, in road tests, the system should be reprogrammable as simply as possible.

With the foregoing and other objects in view there is provided, in accordance with the invention, a control method for an internal combustion engine, which comprises storing at least one address of at least one address distributor of a variable external memory as memory contents of an address block of the variable external memory; storing addresses of data in at least one data block of the variable external memory associated with the at least one address distributor as memory contents of the at least one address distributor; storing an operating program and an initializing program in a read-only memory of a microcomputer; reading out all of the address distributors from the external memory and storing them in a working memory of the microcomputer at addresses determined by the operating program, through the use of the initializing program with the aid of the address block at the start of the control method; and accessing specific data in each of the at least one data block through the associated address distributors stored in the working memory, through the use of the operating program.

In the above-described embodiment of the invention, an address block is used having memory contents which refer solely to the address distributor. No provision is made for direct reference to a memory cell of a data block as in the prior art. At least one address of a data block is stored as memory contents in the address distributor.

When the control system starts up, the microcomputer runs through an initializing program, before the actual operating program begins. In this process, the address distributor is addressed through the address block, and its memory contents are stored in the working memory of the microcomputer at addresses that are provided in the operating program at the various data callups. During actual operation, the operating program can then access the data in the external memory through the address distributor stored in the working memory. During operation, the microcomputer therefore no longer needs to address twice indirectly, as in the prior art, but instead only once, indirectly. This requires correspondingly fewer increments and therefore makes the course of the operating program faster.

The system according to the invention assures a simple change in the access to the data used in road tests. Since the association with these data in the address distributor is fixed, and this address distributor is located in the working memory of the microcomputer, it can be changed very easily and arbitrarily often. It is only the optimal version that is finally found which needs to then be stored in the external memory.

Other features which are considered as characteristic for the invention are set forth in the appended claims.

Although the invention is illustrated and described herein as embodied in a control method for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
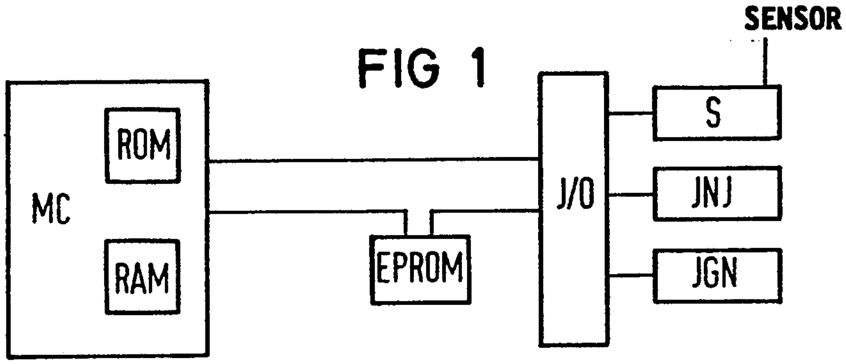
FIG. 1 is a block circuit diagram of a control system.

Referring now to the figures of the drawing in detail and first, particularly, to FIG. 1 thereof, there is seen a block circuit diagram of a control system for an internal combustion engine for operating ignition and injection. A microcomputer MC is a single-chip computer that is available on the market, with a read-only memory ROM and a working memory RAM integrated on the chip. The microcomputer MC has access to an external memory in the form of an EPROM through a bus connection, and has access to ignition and injection systems IGN, INJ of the engine through a corresponding interface I/O. Information regarding the operating state of the engine is received by the microcomputer MC through various sensors S, and the microprocessor is likewise connected to the sensors through the interface I/O. An operating program BP which is stored in the read-only memory ROM of the microcomputer MC, controls the ignition and injection functions. The read-only memory ROM also contains an initializing program IP, which will be explained below.

The operating program BP and the initializing program IP are the same for each engine variant, so that the microcomputer MC can be used, in a completely programmed condition, for each variant. The specific data for each individual engine variant are stored in the external memory EPROM, to which the microcomputer MC can gain access through the bus connection.

Figure 2:
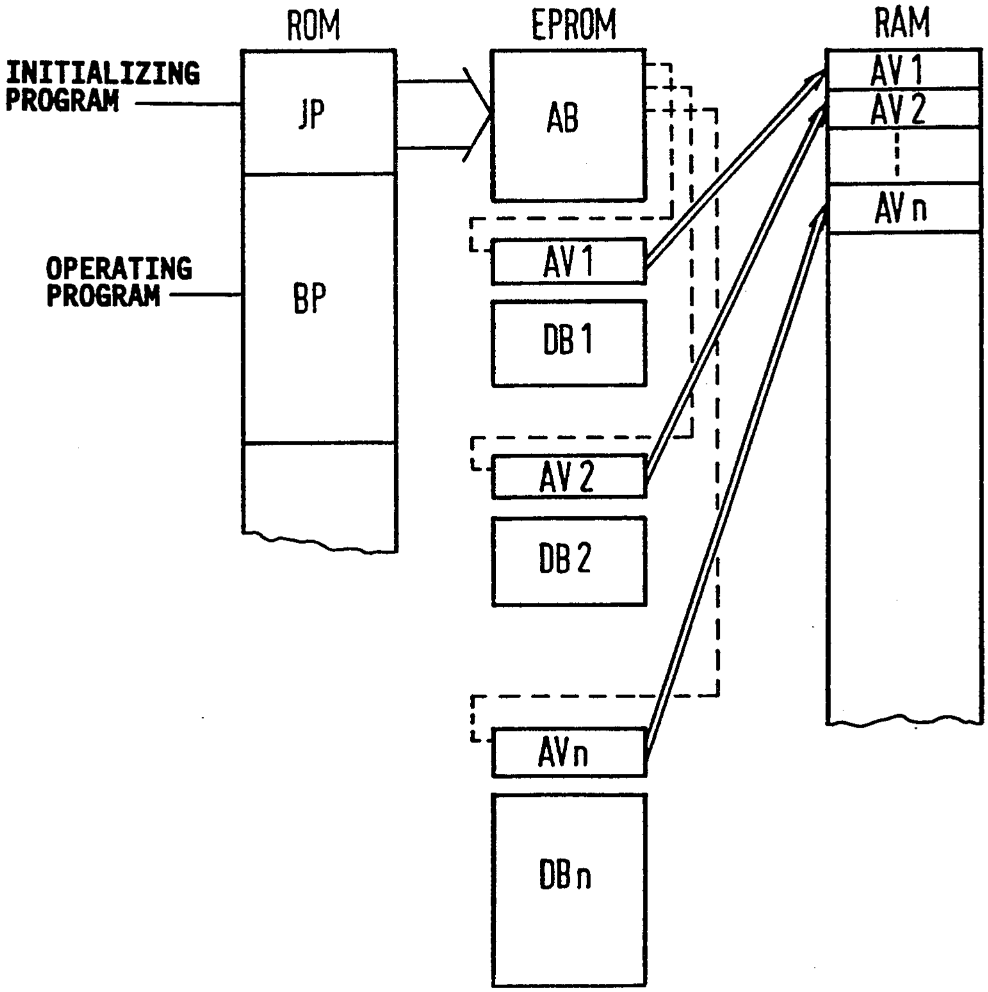
FIG. 2 is a fragmentary, block circuit diagram showing the data structure in the various memories and illustrating the procedure in an initializing program.

The data structure in the various memories can be seen from FIG. 2. In the read-only memory ROM, the initializing program IP is stored in a first memory region, and the operating program BP is stored in a second memory region.

The EPROM has a first memory region in which an address block AB is stored, and further memory regions in each of which one data block DB1 to DBn with a preceding address distributor AV1 to AVn is stored.

The various blocks are linked as follows: the memory contents of the address block AB are the addresses of the address distributors AV1 to AVn. The address distributors AV1 to AVn then contain either only one address or a great number of addresses in the form of a vector, among which specific data are stored in the various data blocks DB1 to DBn.

At the start of the control system, the initializing program IP is first called up in ROM, through suitable hardware control means. The initializing program IP stores the starting address of the address block AB in which the addresses of the various address distributors AV1 to AVn are located as memory contents. The initializing program IP reads out the address distributors AV1 to AVn over this path and stores them in RAM, at addresses that are determined by the operating program BP. This procedure is indicated in FIG. 2 by the broken lines and arrows.

Figure 3:
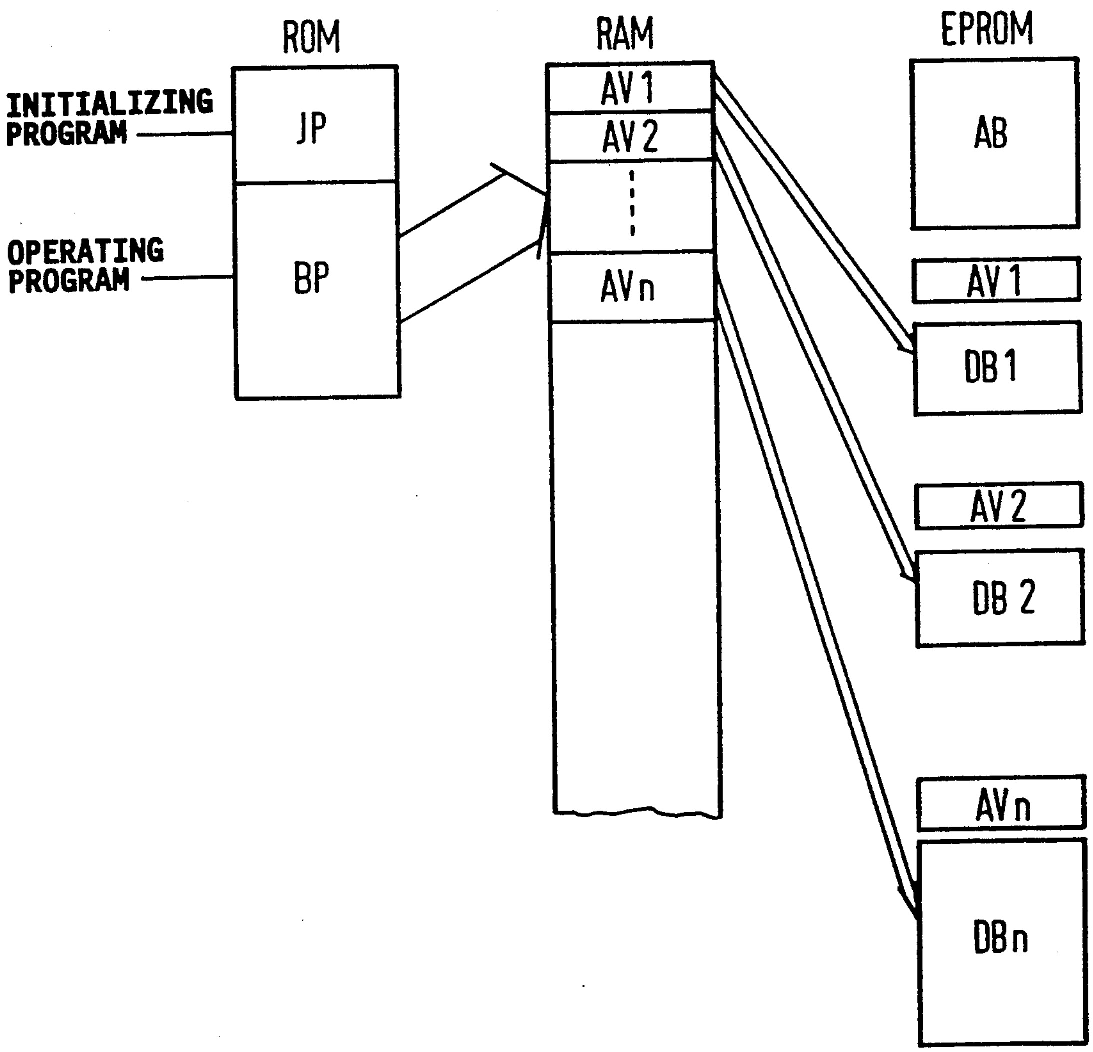
FIG. 3 is a fragmentary, block circuit diagram used to illustrate the procedure in an operating program.

During operation of the control system, the operating program BP then addresses one of the address distributors AV1 to AVn in RAM upon each data callup. This procedure is shown in FIG. 3. Since the various address distributors AV1 to AVn contain the addresses of the specific data in the data blocks DB1 to DBn, the operating program BP can access these data.

The address block AB and the address distributors AV1 to AVn in the EPROM are accordingly not needed in operation. Therefore, since the increments for addressing and reading out these blocks are then unnecessary, the running of the operating program BP is shortened considerably in comparison.

The assignment of the specific data in the data blocks DB1 to DBn is thus defined in operation through the address distributors AV1 to AVn stored in RAM. If this data assignment is to be changed, for instance in road tests, this can be done by changing the addresses in the address distributors AV1 to AVn in RAM. This kind of access to RAM is simple to accomplish, such as through a diagnosis command, and in particular the contents of a RAM can be changed arbitrarily often without disadvantageous effects. In contrast, if these changes are performed in the EPROM itself, the service life of the EPROM would quickly be exhausted. Moreover, the process of change is considerably more complicated in an EPROM. Naturally, from the beginning the EPROM must contain all of the data to which access will be necessary in an optimizing process.

I claim:

1. A control method for an internal combustion engine, which comprises:

storing at least one address of at least one address distributor in an address block of a variable external memory;

associating an address distributor with at least one data block such that the memory contents of the address distributor are addresses of data in the associated data block;

storing the at least one data block in the variable external memory;

storing an operating program and an initializing program in a read-only memory of a microcomputer;

reading out, with the initializing program and aided by the address block, all of the address distributors from the external memory and storing them in a working memory of the microcomputer at addresses determined by the operating program, at the start of the control method; and accessing, with the operating program, the data in each of the at least one data block through the associated address distributors stored in the working memory.

2. A control method for an internal combustion engine including a microcomputer having a read-only memory and a working memory, and a variable external memory having an address block, at least one address distributor, and at least one data block associated with the at least one address distributor, which comprises:

storing at least one address of the at least one address distributor as an address block in the external memory;

storing addresses of data in the at least one data block associated with the at least one address distributor in the external memory;

storing an operating program and an initializing program in the read-only memory;

reading out, with the initializing program and aided by the address block, all of the address distributors from the external memory and storing them in the working memory at addresses determined by the operating program, at the start of the control method; and accessing, with the operating program, the data in each of the at least one data block through the associated address distributors stored in the working memory.

* * * * *